United States Patent
Wang et al.

(10) Patent No.: US 7,843,888 B1
(45) Date of Patent: Nov. 30, 2010

(54) METHODS AND APPARATUS FOR TURBO SPACE-TIME TRELLIS CODING

(75) Inventors: Rui R. Wang, Ottawa (CA); Chao Wang, legal representative, Ottawa (CA); Ming Jia, Ottawa (CA); Yuri S. Shinakov, Moscow (RU); Alexandre M. Chloma, Moskovskaja Oblast (RU); Mikhail G. Bakouline, Moskovskaja Oblast (RU); Vitali B. Kreindeline, Moscow (RU)

(73) Assignee: Nortel Networks Limited, St. Laurent, Quebec (CA)

( * ) Notice: Subject to any disclaimer, the term of this patent is extended or adjusted under 35 U.S.C. 154(b) by 1548 days.

(21) Appl. No.: 10/432,216

(22) PCT Filed: Nov. 22, 2000

(86) PCT No.: PCT/RU00/00475

§ 371 (c)(1),
(2), (4) Date: Mar. 7, 2005

(87) PCT Pub. No.: WO02/43314

PCT Pub. Date: May 30, 2002

(51) Int. Cl.
*H04W 4/00* (2009.01)
*H03M 13/00* (2006.01)
(52) U.S. Cl. ........................ 370/334; 714/752
(58) Field of Classification Search ................. 370/334; 375/261, 295, 264, 265, 267; 714/746, 752
See application file for complete search history.

(56) References Cited

U.S. PATENT DOCUMENTS 5,907,582 A * 5/1999 Yi .............................. 375/259
6,298,463 B1 * 10/2001 Bingeman et al. ........... 714/786
7,436,895 B1 * 10/2008 Tujkovic ..................... 375/267

OTHER PUBLICATIONS

Yamashita M Et Al: "Transmit diversity technique using space division multiplexing and turbo codes" Electronics Letters, Feb. 1, 2001, IEE, UK, vol. 37, No. 3, pp. 184-185, XP002176430.

Bauch G: "Concatenation of Space-Time Block Codes and "Turbo"-TCM" ICC'99. IEEE International Conference on Communications. Conference Record. Vancouver, CA Jun. 6-10, 1999, IEEE International Conference on Communications, New York, NY: IEEE, US, vol. 2 (Jun. 6, 1999), pp. 1202-1206, XP000898047.

Robertson P Et Al: "Bandwidth-Efficient Turbo Trellis-Coded Modulation Using Punctured Component Codes" IEEE Journal on Selected Areas in Communications, IEEE Inc. New York, US, vol. 16, No. 2, XP000741775.

(Continued)

*Primary Examiner*—George Eng
*Assistant Examiner*—Wesley L Kim (57) ABSTRACT

Space-time diversity using a plurality of transmit antennas is provided with a turbo coding arrangement comprising two recursive systematic convolutional coders, to one of which input bits are supplied directly and to the other of which the information bits are supplied after interleaving of bit groups for respective symbol intervals. Symbols produced by the coders and comprising systematic and parity information are supplied to paths to the antennas alternately in successive symbol intervals to provide the space-time diversity. Arrangements are described for 2 and 4 antennas and for various convolutional codes, and an iterative decoder is also described.

17 Claims, 5 Drawing Sheets

OTHER PUBLICATIONS

Tujkovic D: "Recursive space-time trellis codes for turbo coded modulation" Globecom '00—IEEE. Global Telecommunicatoins Conference. Conference Record (Cat. No. 00CH37137), Proceedings of Global Telecommunications Conference, San Francisco, CA, USA, Nov. 27-Dec. 1, 2000, pp. 1010-1015 vol. 2, XP002176431.

* cited by examiner

METHODS AND APPARATUS FOR TURBO SPACE-TIME TRELLIS CODING

This invention relates to communications, for example for a cellular wireless communications system, using a combination of so-called turbo, space-time (ST), and trellis coding (TC) or trellis coded modulation (TCM) techniques.

BACKGROUND OF THE INVENTION

As is well known, wireless communications channels are subject to time-varying multipath fading, and it is relatively difficult to increase the quality, or decrease the effective error rate, of a multipath fading channel. While various techniques are known for mitigating the effects of multipath fading, several of these (e.g. increasing transmitter power or bandwidth) tend to be inconsistent with other requirements of a wireless communications system. One technique which has been found to be advantageous is antenna diversity, using two or more antennas (or signal polarizations) at a transmitter and/or at a receiver of the system.

In a cellular wireless communications system, each base station typically serves many remote (fixed or mobile) units and its characteristics (e.g. size and location) are more conducive to antenna diversity, so that it is desirable to implement antenna diversity at least at a base station, with or without antenna diversity at remote units. At least for communications from the base station in this case, this results in transmit diversity, i.e. a signal is transmitted from two or more transmit antennas.

S. M. Alamouti, "A Simple Transmit Diversity Technique for Wireless Communications", IEEE Journal on Selected Areas in Communications, Vol. 16, No. 8, pages 1451-1458, October 1998 describes a simple transmit diversity scheme using space-time block coding (STBC). For the case of two transmit antennas, complex symbols s0 and −s1* are successively transmitted from one antenna and simultaneously complex symbols s1 and s0* are successively transmitted from the other antenna, where * represents the complex conjugate. These transmitted symbols constitute what is referred to as a space-time block.

It is also known to use various coding schemes in order to enhance communications. Among such schemes, it has been recognised that so-called turbo coding (parallel concatenated convolutional coding) enables iterative decoding methods to achieve results which are close to the Shannon limit for AWGN (additive white Gaussian noise) communication channels. A turbo coder uses two, typically identical, recursive systematic convolutional (RSC) component coders, signals to be transmitted being supplied directly to one of the component coders and via an interleaver to the other of the component coders. Accordingly, it would be desirable to combine turbo and space-time coding techniques in the same transmitter.

V. Tarokh et al., "Space-Time Codes for High Data Rate Wireless Communication: Performance Criterion and Code Construction", IEEE Transactions on Information Theory, Vol. 44, No. 2, pages 744-765, March 1998 describes various convolutional, or trellis, codes which can be used with two or more transmit antennas to provide the advantages of trellis (convolutional) coding and space-time coding. Although these codes are considered optimal for maximum diversity gain, they are not necessarily optimal for coding gain. Furthermore, these codes are non-recursive. In contrast, it is well established that the best efficiency for turbo coding is achieved using recursive codes. Consequently, the codes described by Tarokh et al. are not suitable for use in a turbo coding arrangement.

P. Robertson et al., "Bandwidth-Efficient Turbo Trellis-Coded Modulation Using Punctured Component Codes", IEEE Journal on Selected Areas in Communications, Vol. 16, No. 2, pages 206-218, February 1998 describes a turbo coder using Ungerboeck and multidimensional TCM component codes, in which the interleaver operates on groups each of m information bits. For each step corresponding to a group of m information bits, a signal mapper associated with each component coder produces n symbols, where n=D/2 and D is the signal set dimensionality; for example D=2 or 4 and n=1 or 2. An n-symbol de-interleaver de-interleaves output symbols from the second component coder, and a selector alternately for successive steps selects symbols output from the first component coder and symbols from the de-interleaver and supplies them to a single output path. This arrangement does not provide transmit diversity and this document is not concerned with space-time coding.

G. Bauch, "Concatenation of Space-Time Block Codes and "Turbo"-TCM", Proceedings of the International Conference on Communications, ICC'99, pages 1202-1206, June 1999 describes two types of turbo trellis coded modulation (TCM) coder, whose output is supplied to a space-time block coder, so that the turbo-TCM and STBC arrangements are simply concatenated with one another. One of these two types of turbo TCM coder is as described by Robertson et al. (to which reference is made for details) as discussed above using Ungerboeck codes and providing one symbol at the output of the mapping function, but the Bauch illustration of this does not show the symbol de-interleaver. This Bauch publication does not discuss multidimensional component codes.

A continuing need exists to provide further improvements in wireless communications.

SUMMARY OF THE INVENTION

According to one aspect, this invention provides a method of providing space-time diversity for information to be transmitted from a plurality T of antennas, comprising the steps of: in each of a plurality of successive symbol intervals, producing T symbols comprising systematic information and parity information at outputs of each of two recursive systematic convolutional coders, to one of which coders input bits are supplied directly and to the other of which coders said information bits are supplied after interleaving of bit groups for respective symbol intervals in an interleaving block; and selecting first and second different mappings, each of T symbols from said symbols produced at the outputs of the coders, in respective alternating symbol intervals for supply to the T antennas to provide said space-time diversity, the interleaving and mappings being arranged so that systematic information is selected for all of the input bits in the interleaving block.

Preferably the first mapping selects the T symbols from one of the coders and the second mapping selects the T symbols from the other of the coders.

In an embodiment of the invention described below, T=2 and in each symbol interval each coder produces a systematic information symbol and a parity information symbol, the first mapping provides the systematic information symbol and the parity information symbol from one of the coders for supply respectively to first and second antennas, and the second mapping provides the systematic information symbol and the parity information symbol from the other of the coders for supply respectively to the second and the first antennas. Thus this is an example of a case in which T is even and in each symbol interval each coder produces T/2 systematic information symbols and T/2 parity information symbols.

Alternatively, the T symbols produced by each coder in each symbol interval can include at least one symbol comprising systematic and parity information.

The method may also include the step of changing a phase of symbols from the two coders relative to one another, in particular providing a phase rotation of $\pi/2$ for symbols at the output of one of the coders. This can be particularly desirable when t>2, for example when T=4.

Preferably the interleaved bit groups each comprise m bits where m is an integer, and symbols produced at the outputs of the coders comprise M-PSK symbols where $M=2^m$.

Another aspect of the invention provides a coding arrangement comprising: first and second recursive systematic convolutional coders each arranged to produce a plurality of T symbols in each of a plurality of successive symbol intervals from m bits supplied thereto, where m is an integer; an interleaver arranged to interleave groups each of m input bits within an interleaving block with a mapping of even-to-even and odd-to-odd, or even-to-odd and odd-to-even, positions; input bits supplied to the first coder and to the interleaver, and interleaved bits supplied from the interleaver to the second coder; and a selector arranged to supply different ones of the T symbols from the coders in alternate symbol intervals to respective ones of T output paths, the T symbols selected in each of the alternating symbol intervals including all of the systematic information from a respective one of the coders.

Thus the method and coding arrangement of the invention provide a desirable combination of turbo coding with recursive systematic convolutional component coders and space-time coding for transmit diversity.

The invention also provides a decoding arrangement for iteratively decoding received symbols coded by the coding arrangement recited above, comprising: first and second soft output decoders for decoding the coding by said first and second recursive systematic convolutional coders respectively, in response to an input vector and soft input information; an interleaver corresponding to the interleaver of the coder, arranged to couple soft output information from the first decoder as soft input information to the second decoder; a de-interleaver converse to said interleavers, arranged to couple soft output information from the second decoder as soft input information to the first decoder; and a selector arranged to supply a received signal vector and a zero input vector alternately in successive symbol intervals as the input vector to the first and second decoders.

The invention further provides a method of iteratively decoding a received signal comprising symbols coded by the method recited above, comprising the steps of: supplying a received signal vector and a zero input vector alternately in successive symbol intervals as input vectors to two decoders for decoding the coding by said two recursive systematic convolutional coders respectively; interleaving, in the same manner as in the method of coding, a soft output of one of the decoders, corresponding to said one of the coders, to provide a soft input to the other of the decoders; and de-interleaving, conversely to the interleaving, a soft output of said other of the decoders to provide a soft input to said one of the decoders.

BRIEF DESCRIPTION OF THE DRAWINGS

The invention will be further understood from the following description with reference to the accompanying drawings, in which by way of example.

DETAILED DESCRIPTION

Figure 1:
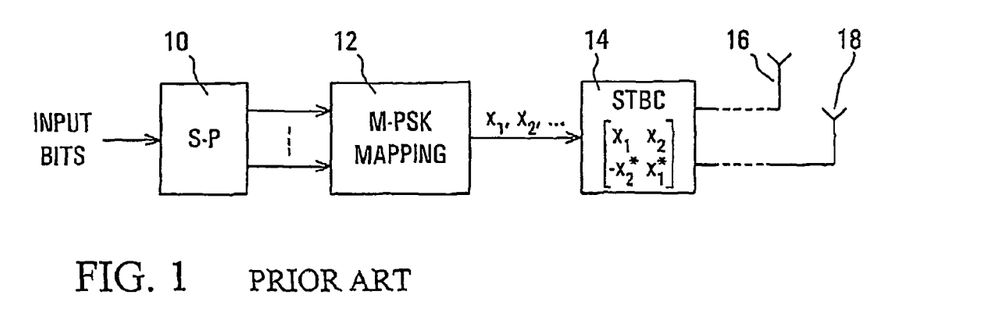
FIG. 1 illustrates parts of a known space-time block code (STBC) transmitter.

Referring to the drawings, FIG. 1 illustrates parts of a known space-time block code (STBC) transmitter. For simplicity and clarity in this and other figures of the drawings, only those parts are shown which are necessary for a full understanding of the prior art and embodiments of this invention.

The transmitter of FIG. 1 includes a serial-to-parallel (S-P) converter 10, an M-PSK mapping function 12, and a space-time block coder (STBC) 14 providing outputs, via transmitter functions such as up-converters and power amplifiers not shown but represented in FIG. 1 by dashed lines, to at least two antennas 16 and 18 which provide transmit diversity. The S-P converter 10 is supplied with input bits of information to be communicated and produces output bits on two or more parallel lines to the M-PSK mapping function 12, which produces from the parallel bits sequential symbols $x_1, x_2, \ldots$ of an equal-energy signal constellation.

Figure 2:
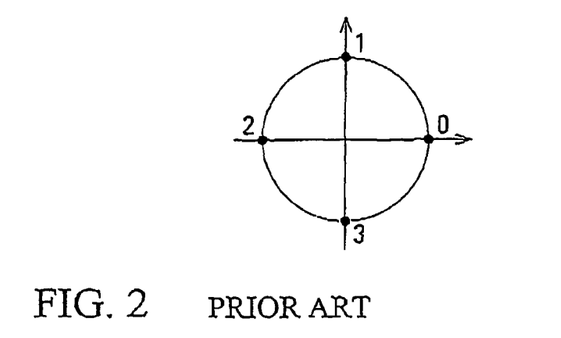
FIG. 2 illustrates a known signal point constellation for QPSK symbols.

For example, as shown in FIG. 1 the mapping function 12 may provide a Gray code mapping of in each case 2 input bits from the S-P converter 10 to respective ones of M=4 signal points of a QPSK (quadrature phase shift keying) signal point constellation as illustrated in FIG. 2, the signal points being identified as symbols 0 to 3 respectively. For simplicity and convenience, Gray code QPSK mapping is assumed throughout the following description, but it can be appreciated that the mapping function 12 can provide any desired mapping to a signal point constellation with any desired number M of phase states; for example M=2 (for which the S-P converter 10 is not required), 4, or 8.

The QPSK symbols $x_1, x_2, \ldots$, represented by complex numbers, are supplied to the STBC 14, which for simplicity is shown in FIG. 1 as having two outputs for the respective transmit antennas 16 and 18, but may instead have more than two outputs for a corresponding larger number of transmit antennas. For the case of two antennas as shown, the STBC 14 forms a space-time block of symbols, as represented in FIG. 1, from each successive pair of symbols $x_1$ and $x_2$ supplied to its input.

More particularly, the STBC function is represented by a T-by-T orthogonal matrix $H_x$, where T is the number of transmit antennas and hence symbol outputs of the STBC 14. For the case of T=2 as represented in FIG. 1, $$H_x(x_1, x_2) = \begin{bmatrix} x_1 & x_2 \\ -x_2^* & x_1^* \end{bmatrix}$$

In accordance with this matrix $H_x$, for each pair of PSK symbols $x_1$ and $x_2$ supplied to the input of the STBC 14, in a first symbol interval the antenna 16 is supplied with the symbol $x_1$ and the second antenna 18 is supplied with the symbol $x_2$, and in a second symbol interval the first antenna 16 is supplied with the symbol $-x_2^*$ and the second antenna 18 is supplied with the symbol $x_1^*$, where * denotes the complex conjugate. Thus both PSK symbols in each pair are transmitted twice in different forms, from different antennas and at different times to provide both space and time diversity. It can be seen that each column of the matrix $H_x$ indicates the symbols transmitted in successive intervals from a respective antenna, and each row represents a respective symbol transmission interval.

Figure 3:
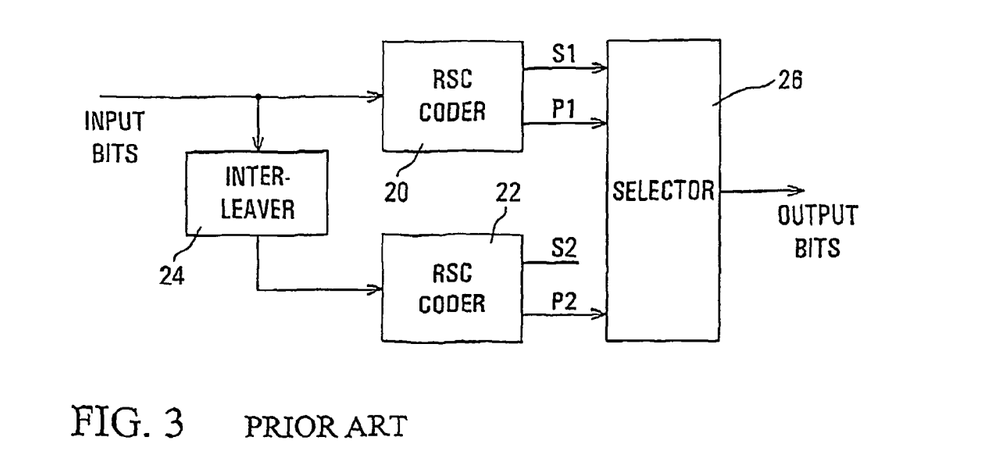
FIG. 3 illustrates a known turbo coder.

Referring to FIG. 3, a known turbo (parallel concatenated convolutional) coder comprises two recursive systematic convolutional (RSC) coders 20 and 22 which are referred to as the constituent or component codes of the turbo coder, an interleaver 24, and a selector 26. Input bits are supplied to the input of one coder 20, which produces at its outputs both systematic bits S1, which are the same as the input bits, and parity bits P1. The input bits are also supplied to and interleaved by the interleaver 24, and the interleaved bits are supplied to the input of the other coder 22, which produces at its outputs both systematic bits S2, which are the same as the interleaved input bits, and parity bits P2. The outputs of the two coders 20 and 22 are supplied to inputs of the selector 26, except that typically and as shown in FIG. 3 the systematic bit output of the coder 22 is not connected because the interleaved bits at this output are never selected by the selector 26.

The selector 26 selects all of the systematic bits S1, and some or all of the parity bits P1 and P2 from the coders 20 and 22 respectively, and supplies them to an output of the turbo coder as output bits. The selection of parity bits depends upon the rate of the coder. For example, for a rate 1/3 (3 output bits for each input bit) coder, the selector 26 can select all of the parity bits P1 and P2. For a rate 1/2 (2 output bits for each input bit) coder, the selector 26 can alternately select the parity bits P1 and P2, so that only half of the parity bits P1 and half of the parity bits P2 are output, this process being referred to as puncturing.

In the turbo-TCM arrangement (Robertson et al.) referred to in the Background of the Invention, the interleaver 24 operates on groups each of m bits which are mapped at the output of each component coder (20, 22) into, for example, a PSK symbol combining the systematic and parity information. The symbols from the second component coder (22) are de-interleaved by a symbol de-interleaver, and the output selector alternately selects the symbols output from the first component coder (20) and the de-interleaver. The interleaver (and consequently also the de-interleaver) in this case must provide an even-to-even and odd-to-odd (or even-to-odd and odd-to-even) position mapping.

In the concatenated SBTC and turbo code (Bauch) arrangements referred to in the Background of the Invention, in essence the output bits of a turbo coder such as that of FIG. 3 are supplied as input bits to a space-time block coder such as that of FIG. 1, or the output symbols from a turbo-TCM coder as described by Robertson et al. are supplied as input symbols to an STBC coder 14 as described above with reference to FIG. 1.

Figure 4:
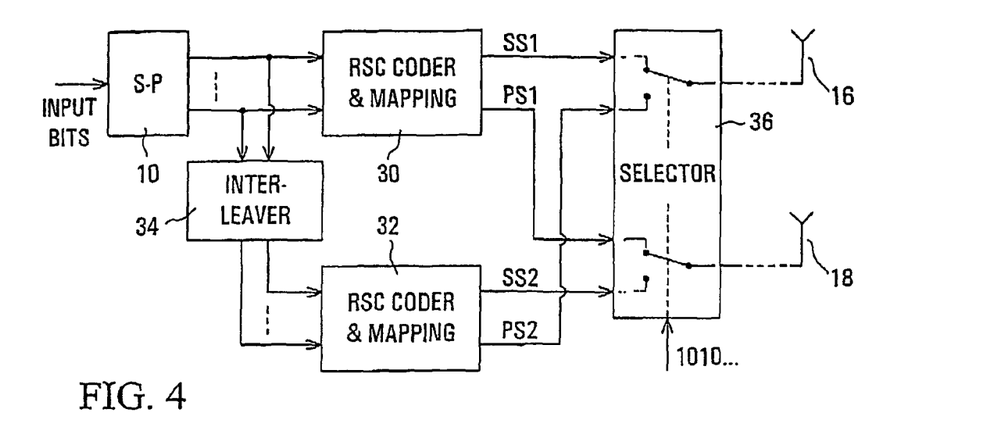
FIG. 4 illustrates parts of a turbo space-time trellis coded modulation (STTCM) coding arrangement for a transmitter using two transmit antennas, in accordance with an embodiment of this invention.

FIG. 4 illustrates parts of a turbo space-time trellis coded modulation (STTCM) coding arrangement for a transmitter using two transmit antennas, in accordance with an embodiment of this invention. As in the case of FIG. 1, the two antennas are referenced 16 and 18, and input bits of information to be communicated are supplied to the S-P converter 10, which is again illustrated with two outputs for QPSK symbol transmission. The remainder of FIG. 4 represents the turbo STTCM coding arrangement, which comprises two RSC coder and mapping functions 30 and 32, an interleaver 34, and a selector 36 having two outputs for the respective transmit paths to the two antennas 16 and 18. Dashed lines at the inputs to the RSC coder and mapping functions 30 and 32 indicate that these, and the interleaver 34, may have a different number of inputs for other than QPSK symbols, as described above.

The bits supplied in parallel from the S-P converter 10 are interleaved in groups (in this case, in pairs) by the interleaver 34. The non-interleaved bit pairs supplied to the function 30, and the interleaved bit pairs supplied to the function 32, are coded and mapped into QPSK symbols by these functions as described further below. Consequently, the function 30 produces at its two outputs QPSK symbols SS1 which represent systematic information corresponding to the input bits, and QPSK symbols PS1 which represent parity information produced by the recursive convolutional coding of the function 30. Similarly, the function 32 produces at its two outputs QPSK symbols SS2 which represent systematic information corresponding to the input bits as interleaved in bit pairs by the interleaver 34, and QPSK symbols PS2 which represent parity information produced by the recursive convolutional coding of the function 32 from the interleaved input bit pairs. Although it is assumed here for convenience and simplicity that the RSC coding and mapping functions 30 and 32 are identical, as is typically the case for the component coders of a turbo coder as described above with reference to FIG. 3, this need not necessarily be the case and these functions could instead differ from one another.

The selector 36 is controlled by a control signal of alternating ones and zeros (1010 . . . as illustrated) at the symbol (bit pair) rate, and performs selection and puncturing functions as represented in FIG. 4 by switches within the selector 36. In a first state of the control signal, for example when the control signal is a binary 1, the switches of the selector 36 have the states illustrated in FIG. 4 in which the systematic symbol SS1 and the parity symbol PS1 from the RSC coder and mapping function 30 are supplied to the output paths to the transmit antennas 16 and 18 respectively, and the outputs SS2 and PS2 of the function 32 are not used. In a second state of the control signal, for example when the control signal is a binary 0, the switches of the selector 36 have their opposite states in which the systematic symbol SS2 and the parity symbol PS2 from the RSC coder and mapping function 32 are supplied to the output paths to the transmit antennas 18 and 16 respectively, and the outputs SS1 and PS1 of the function 30 are not used.

It can be appreciated that, with the selector 36 alternately selecting the non-interleaved systematic symbols SS1 and the interleaved systematic symbols SS2, in order to ensure that all of the systematic information is transmitted it is necessary for the interleaver 34 to map even positions at its input to even positions at its output, and odd positions at its input to odd positions at its output (or, alternatively, even-to-odd and odd-to-even position mapping), as in the case of the Robertson et al. arrangement discussed above. The interleaver 34 is arranged to provide such mapping accordingly.

From the above description and from FIG. 4 it can be appreciated that the units 30, 32, 34, and 36 are arranged in the manner of a turbo coder, for which the functions 30 and 32 provide recursive convolutional coding as is desired for a turbo coder, and the selector 36 combines the selection and puncturing functions of a turbo coder with the functions of a space-time block coder for transmit diversity using the two antennas 16 and 18. The even-to-even and odd-to-odd (or even-to-odd and odd-to-even) position mapping by the interleaver 34 ensures that systematic symbols representing all of the input bits are transmitted over time (i.e. in each interleaving block), despite the puncturing that is applied to the systematic symbols SS1 and SS2 individually. Thus the units 30, 32, 34, and 36 provide the combined functions of turbo coding, recursive trellis coded modulation, and space-time coding.

It is necessary to determine desirable recursive trellis or convolutional codes, and hence forms of the functions 30 and 32, for use in the arrangement described above with reference to FIG. 4. The encoding process can be described in various ways, one of which, adopted below, is by coder state and output matrices.

For a coder having N states and supplied with input symbols with M possible values (e.g. in this description M=4 for the paired input bits for QPSK), a coder state matrix B is an N by M matrix (N rows and M columns) whose elements B(i,j) determine the coder state for the next symbol, depending upon the current state represented by i, which is an integer from 0 to N−1, and the current input symbol represented by j, which is an integer from 0 to M−1. A coder output matrix C is also an N by M matrix whose elements C(i,j) determine the output symbol produced when, similarly, the current coder state and the current input symbol are represented by i and j respectively.

For a coder having T output paths for supplying a corresponding number of antennas, a further coder output matrix Z is defined which is also an N by M matrix, derived from the matrix C, with elements Z(i,j) where i and j are as defined above. Each element Z(i,j) consists of T Q-ary symbols which identify the signal supplied to the respective antennas, where Q is determined by the modulation type and for example Q=4 for QPSK. Thus each element consists of T Q-ary symbols $z_t(i,j)$ identifying the signal supplied to the antenna t, where t is an integer from 0 to T−1.

The encoding process is further described by a mapping function from the coder outputs to the signal point constellations used for transmission. For simplicity and convenience, throughout the following description this mapping function is assumed to be as described above with reference to FIG. 2, i.e. a Gray code mapping for QPSK symbols.

Although an encoding process can be fully described for implementation in the manner outlined above, this is not sufficient to classify a code. For the latter purpose, a convolutional code can be described by a coder state matrix equation:

$$\Phi_{i+1} = W\Phi_i \oplus GU_i$$

and a coder output matrix equation:

$$Z_i = H_\phi \Phi_i \oplus H_u U_i$$

where $\Phi_i$ is an n-dimensioned binary vector of the current coder state and $n=\log_2(N)$, $U_i$ is an m-dimensioned binary input vector and $m=\log_2(M)$, $Z_i$ is a p-dimensioned binary output vector, and $p=\log_2(P)$ and $P=Q^T$, $\oplus$ represents modulo-2 addition (or, equivalently, an exclusive-or function), and G, W, $H_\phi$, and $H_u$ are respective gain or weighting factor binary matrices.

Figure 5:
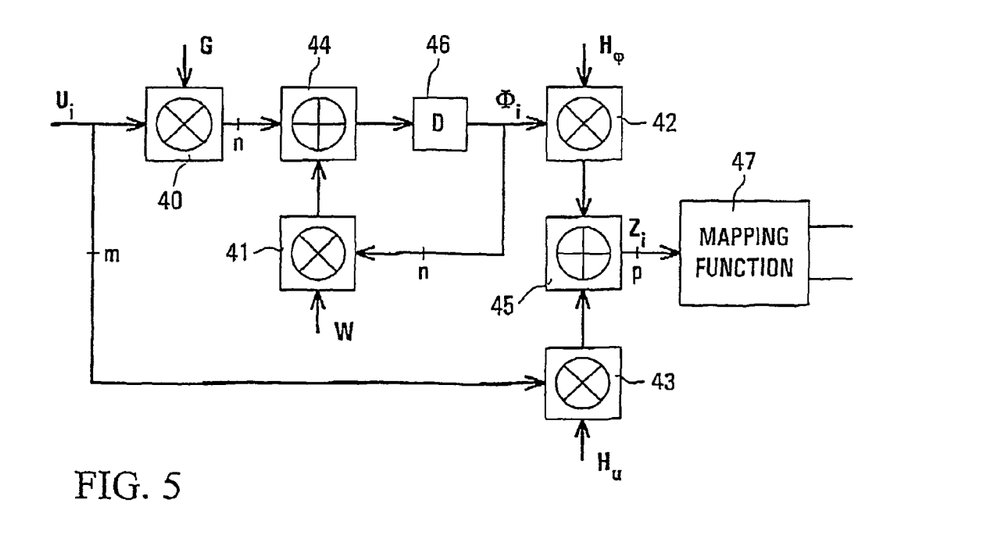
FIG. 5 illustrates a general form of convolutional or trellis coder.

To assist in an understanding in this respect, FIG. 5 illustrates a general form of convolutional or trellis coder which corresponds to the last two equations above. Referring to FIG. 5, this coder comprises multipliers 40 to 43 which are supplied with the respective gain or weighting factors. Each input symbol $U_i$ is supplied to the multipliers 40 and 43, and the current coder state $\Phi_i$ is supplied to the multipliers 41 and 42. The outputs of the multipliers 40 and 41 are combined in a modulo-2 adder 44 in accordance with the first of the two equations above, the output of which adder is delayed by one symbol interval D in a delay unit 46 to provide the next coder state. The outputs of the multipliers 42 and 43 are combined in a modulo-2 adder 45 in accordance with the second of the two equations above, the output of which adder is supplied to a mapping function 47 which performs the QPSK mapping as described above. Multiple paths for vectors of dimension m, n, and p are denoted for some paths in FIG. 5 in conventional manner by bars on these paths.

A convolutional or trellis code can be classified using the matrix W and a matrix $H=[H_\phi \ H_u]$. In particular, if each row of the matrix W contains no more than one "1", then the code is non-recursive, otherwise the code is recursive. Also, if the matrix $H_u$ has a column with a single non-zero element at the j-th row position and the elements of the j-th row of the matrix $H_\phi$ are all "0", the code contains a systematic component for the j-th bit of the input sequence.

As discussed above, the codes described in the publication by Tarokh et al. referred to above are non-recursive and accordingly are unsuitable for providing an efficient turbo coder arrangement as illustrated in FIG. 4. For small numbers of coder states, the elements of the gain matrices that provide the best codes can be determined by computer searching and simulation, but this becomes impractical for coders with a large number of (e.g. more than 8) coder states, and other methods must be adopted. The codes described below were determined by selecting a prototype binary recursive convolutional code for transmission via a single antenna, using this to construct a trellis for space-time coding using the desired number of antennas, and then modifying the result to improve it for QPSK. Other codes, including codes arrived at in other ways, may alternatively be used, and the following codes are provided only by way of example.

For a 4-state RSC coder and QPSK mapping function which can be used in the transmitter of FIG. 4, the matrices B, C, Z, W, G, $H_\phi$ and $H_u$ can be as follows:

$$B = \begin{bmatrix} 0 & 3 & 2 & 1 \\ 2 & 1 & 0 & 3 \\ 3 & 0 & 1 & 2 \\ 1 & 2 & 3 & 0 \end{bmatrix} \quad C = \begin{bmatrix} 0 & 7 & 13 & 10 \\ 3 & 4 & 14 & 9 \\ 2 & 5 & 15 & 8 \\ 1 & 6 & 12 & 11 \end{bmatrix} \quad Z = \begin{bmatrix} 00 & 13 & 31 & 22 \\ 03 & 10 & 32 & 21 \\ 02 & 11 & 33 & 20 \\ 01 & 12 & 30 & 23 \end{bmatrix}$$

$$W = \begin{bmatrix} 0 & 1 \\ 1 & 1 \end{bmatrix} \quad G = \begin{bmatrix} 1 & 0 \\ 1 & 1 \end{bmatrix} \quad H_\varphi = \begin{bmatrix} 0 & 0 \\ 0 & 0 \\ 1 & 0 \\ 1 & 1 \end{bmatrix} \quad H_u = \begin{bmatrix} 1 & 1 \\ 0 & 1 \\ 1 & 1 \\ 1 & 0 \end{bmatrix}$$

Figure 6:
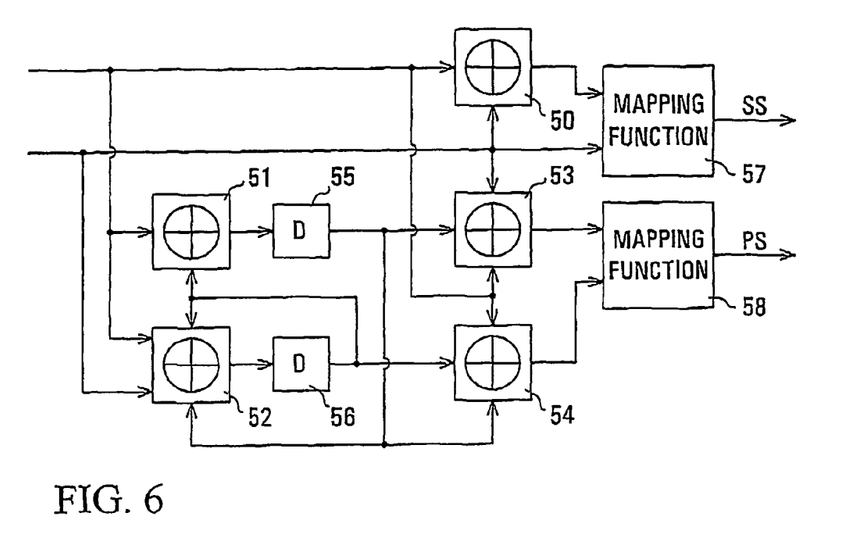
FIG. 6 illustrates a 4-state trellis coder which can be used in the arrangement of FIG. 4.

An implementation of such a coder and its mapping functions, which can be used to form each of the functions 30 and 32 in the arrangement of FIG. 4, is illustrated in FIG. 6.

Referring to FIG. 6, the coder comprises modulo-2 adders 50 to 54, two delay elements 55 and 56 each providing a delay of one symbol (bit pair) interval D, and two mapping functions 57 and 58 each of which provides Gray code mapping of two bits supplied to its inputs to a QPSK symbol at its output, as described above with reference to FIG. 2.

A pair of input bits, supplied from the S-P converter 10 in the case of the function 30 or from the interleaver 34 in the case of the function 32 as described above with reference to FIG. 4, is supplied to inputs of the coder of FIG. 6 in each symbol interval. These bits are supplied to inputs of the adder 50, the output of which adder, and a lower one (as illustrated) of the bit inputs to the coder, are supplied to the mapping function 57, which produces at its output a Gray code QPSK mapped systematic symbol which represents the input bit pair.

The upper one (as illustrated) of the bit inputs to the coder of FIG. 6 is also supplied to an input of each of the adders 51 to 54, and the lower bit input to the coder is also supplied to another input of each of the adders 52 and 53. The output of the adder 51 is supplied to the delay element 55, whose output is supplied to another input of each of the adders 52 to 54. The output of the adder 52 is supplied to the delay element 56, whose output is supplied to another input of each of the adders 51, 52, and 54. It can be seen that the arrangement of the adders 51 to 54 and delay elements 55 and 56 of FIG. 6 implements the coder matrices described above; for example there are three feedback paths from the delay elements 55 and 56 to inputs of the adders 51 and 52 configured according to the three ones in the matrix W given above, the two delay elements providing the four states of the coder. The outputs of the adders 53 and 54 constitute the inputs to the mapping function 58, which accordingly produces at its output a Gray code QPSK mapped parity symbol in accordance with the code given by the above equations.

For an 8-state RSC coder and QPSK mapping function which can be used in the transmitter of FIG. 4, the matrices B, C, Z, W, G, $H_\varphi$ and $H_u$ can be as follows:

$$B = \begin{bmatrix} 0 & 3 & 1 & 2 \\ 7 & 4 & 6 & 5 \\ 1 & 2 & 0 & 3 \\ 6 & 5 & 7 & 4 \\ 3 & 0 & 2 & 1 \\ 4 & 7 & 5 & 6 \\ 2 & 1 & 3 & 0 \\ 5 & 6 & 4 & 7 \end{bmatrix} \quad C = \begin{bmatrix} 0 & 6 & 15 & 9 \\ 1 & 7 & 14 & 8 \\ 1 & 7 & 14 & 8 \\ 0 & 6 & 15 & 9 \\ 3 & 5 & 12 & 10 \\ 2 & 4 & 13 & 11 \\ 2 & 4 & 13 & 11 \\ 3 & 5 & 12 & 10 \end{bmatrix} \quad Z = \begin{bmatrix} 00 & 12 & 33 & 21 \\ 01 & 13 & 32 & 20 \\ 01 & 13 & 32 & 20 \\ 00 & 12 & 33 & 21 \\ 03 & 11 & 30 & 22 \\ 02 & 10 & 31 & 23 \\ 02 & 10 & 31 & 23 \\ 03 & 11 & 30 & 22 \end{bmatrix}$$

$$W = \begin{bmatrix} 1 & 1 & 1 \\ 1 & 0 & 1 \\ 1 & 0 & 0 \end{bmatrix} \quad G = \begin{bmatrix} 1 & 1 \\ 1 & 0 \\ 0 & 0 \end{bmatrix} \quad H_\varphi = \begin{bmatrix} 0 & 0 & 0 \\ 0 & 0 & 0 \\ 1 & 1 & 1 \\ 0 & 0 & 1 \end{bmatrix} \quad H_u = \begin{bmatrix} 1 & 1 \\ 0 & 1 \\ 0 & 1 \\ 1 & 1 \end{bmatrix}$$

Figure 7:
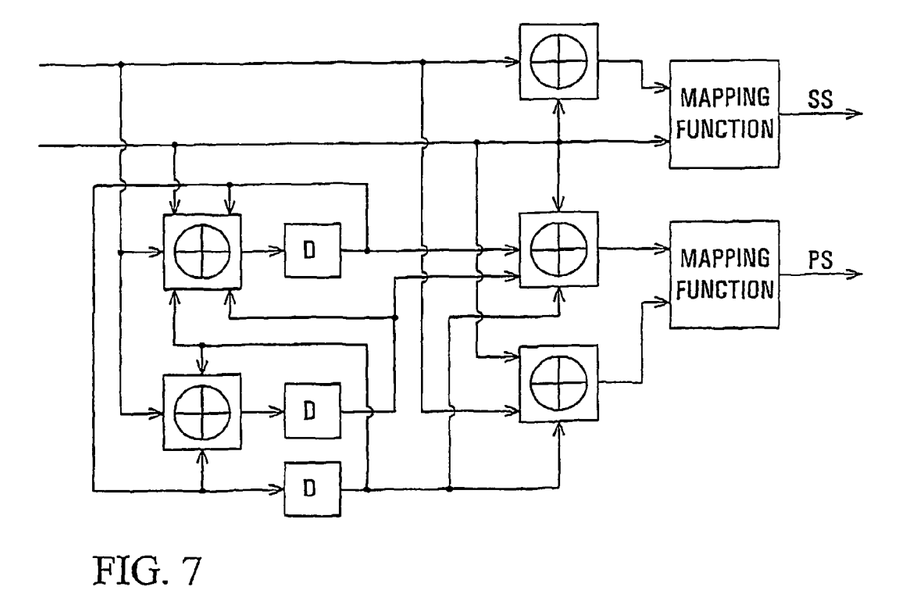
FIG. 7 illustrate's an 8-state trellis coder which can be used in the arrangement of FIG. 4.

An implementation of such a coder and its mapping functions, which can be used to form each of the functions 30 and 32 in the arrangement of FIG. 4, is illustrated in FIG. 7. From a comparison of the equations given above for this 8-state coder and the circuit of FIG. 7 (in which there are three delay elements to provide the 8 states), it can be seen that this circuit implements the recursive systematic convolutional coding of these equations.

For a 16-state RSC coder and QPSK mapping function which can be used in the transmitter of FIG. 4, the matrices B, C, Z, W, G, $H_\varphi$ and $H_u$ can be as follows:

$$B = \begin{bmatrix} 0 & 3 & 1 & 2 \\ 7 & 4 & 6 & 5 \\ 8 & 11 & 9 & 10 \\ 15 & 12 & 14 & 13 \\ 1 & 2 & 0 & 3 \\ 6 & 5 & 7 & 4 \\ 9 & 10 & 8 & 11 \\ 14 & 13 & 15 & 12 \\ 3 & 0 & 2 & 1 \\ 4 & 7 & 5 & 6 \\ 11 & 8 & 10 & 9 \\ 12 & 15 & 13 & 14 \\ 2 & 1 & 3 & 0 \\ 5 & 6 & 4 & 7 \\ 10 & 9 & 11 & 8 \\ 13 & 14 & 12 & 15 \end{bmatrix} \quad C = \begin{bmatrix} 0 & 7 & 10 & 13 \\ 3 & 4 & 9 & 14 \\ 2 & 5 & 8 & 15 \\ 1 & 6 & 11 & 12 \\ 1 & 6 & 11 & 12 \\ 2 & 5 & 8 & 15 \\ 3 & 4 & 9 & 14 \\ 0 & 7 & 10 & 13 \\ 2 & 5 & 8 & 15 \\ 1 & 6 & 11 & 12 \\ 0 & 7 & 10 & 13 \\ 3 & 4 & 9 & 14 \\ 3 & 4 & 9 & 14 \\ 0 & 7 & 10 & 13 \\ 1 & 6 & 11 & 12 \\ 2 & 5 & 8 & 15 \end{bmatrix}$$

$$Z = \begin{bmatrix} 00 & 13 & 22 & 31 \\ 03 & 10 & 21 & 32 \\ 02 & 11 & 20 & 33 \\ 01 & 12 & 23 & 30 \\ 01 & 12 & 23 & 30 \\ 02 & 11 & 20 & 33 \\ 03 & 10 & 21 & 32 \\ 00 & 13 & 22 & 31 \\ 02 & 11 & 20 & 33 \\ 01 & 12 & 23 & 30 \\ 00 & 13 & 22 & 31 \\ 03 & 10 & 21 & 32 \\ 03 & 10 & 21 & 32 \\ 00 & 13 & 22 & 31 \\ 01 & 12 & 23 & 30 \\ 02 & 11 & 20 & 33 \end{bmatrix} \quad W = \begin{bmatrix} 1 & 0 & 1 & 1 \\ 1 & 0 & 0 & 1 \\ 1 & 0 & 0 & 0 \\ 0 & 1 & 0 & 0 \end{bmatrix}$$

$$G = \begin{bmatrix} 1 & 1 \\ 1 & 0 \\ 0 & 0 \\ 0 & 0 \end{bmatrix} \quad H_\varphi = \begin{bmatrix} 0 & 0 & 0 & 0 \\ 0 & 0 & 0 & 0 \\ 1 & 0 & 1 & 0 \\ 1 & 1 & 0 & 1 \end{bmatrix} \quad H_u = \begin{bmatrix} 1 & 0 \\ 0 & 1 \\ 1 & 0 \\ 1 & 1 \end{bmatrix}$$

Figure 8:
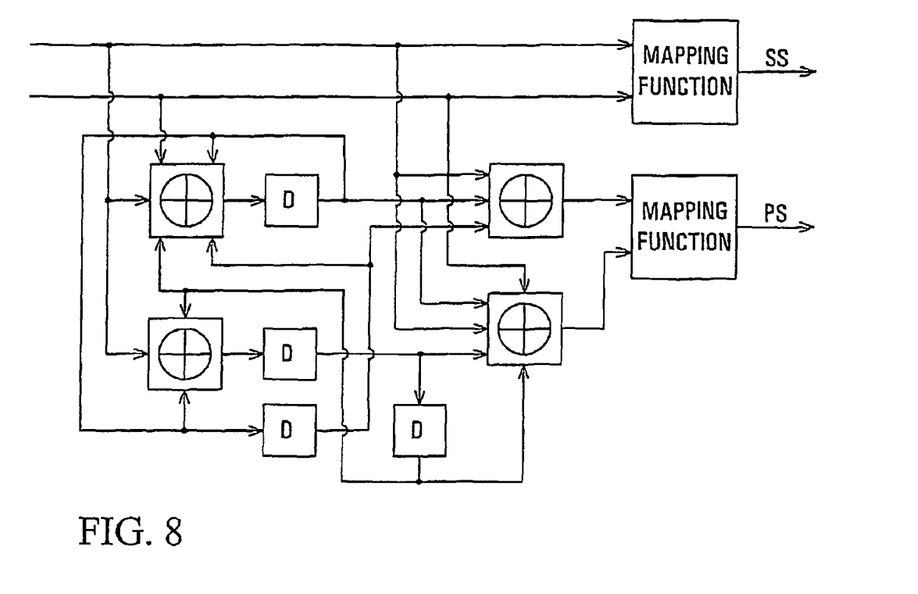
FIG. 8 illustrates a 16-state trellis coder which can be used in the arrangement of FIG. 4.

An implementation of such a coder and its mapping functions, which can be used to form each of the functions 30 and 32 in the arrangement of FIG. 4, is illustrated in FIG. 8. From a comparison of the equations given above for this 16-state coder and the circuit of FIG. 8 (in which there are four delay elements to provide the 16 states), it can be seen that this circuit implements the recursive systematic convolutional coding of these equations.

It can be appreciated from the above description of the coding arrangement of FIG. 4 and the encoders of FIGS. 6 to 8 that in each case, for QPSK symbols as described, there are two input bits in one symbol interval, resulting in four bits (two systematic information bits and two parity bits) being supplied to the QPSK mapping functions of each of the two coders in the turbo coding arrangement. These eight bits are mapped into four QPSK symbols by the mapping functions, and over two successive symbol intervals half of the QPSK symbols are punctured by the selector 36 so that two symbols are transmitted from the two antennas 16 and 18 in each symbol interval. The selector arrangement is such that in a first symbol interval the two antennas transmit systematic and parity information from the coder 30 supplied with non-interleaved input bits, and in a second symbol interval the two antennas transmit systematic and parity information from the other coder 32 supplied with interleaved input bits, space-time diversity being enhanced by the transmission from each antenna of systematic information and parity information symbols alternately in successive symbol intervals.

In the arrangements described above, the mapping functions are arranged so that each QPSK symbol is produced entirely from systematic information or entirely from parity bits. However, this need not be the case, and alternative arrangements are possible in which, for example, each QPSK symbol is instead produced from one systematic information bit and one parity bit. In other words, the inputs to the mapping functions (e.g. 56 and 57 in FIG. 6) for each coder can be rearranged.

This is the case for the coder described by way of example below with reference to FIG. 9, for use in a turbo STTCM coding arrangement for use in a transmitter having four transmit antennas. By way of example, this is a 4-state trellis coder for QPSK symbols. In two successive symbol intervals for space-time diversity a total of eight symbols are transmitted from the four antennas, so that with 50% puncturing there are eight QPSK symbols provided by the mapping functions of the two component coders of the turbo coder arrangement, and consequently in each symbol interval each coder provides four QPSK symbols from its mapping functions. These four QPSK symbols represent four systematic bits and four parity bits, so that in this case there are four input bit lines to the coder.

Figure 9:
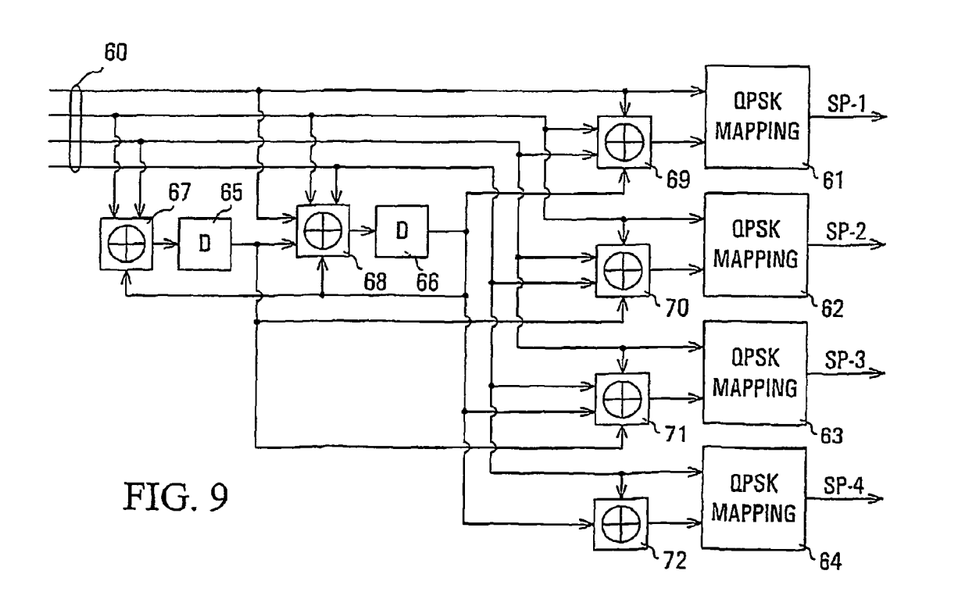
FIG. 9 illustrates a 4-state trellis coder for use in a turbo STTCM coding arrangement for a transmitter having four transmit antennas.

Referring to FIG. 9, the four input bit lines, collectively referenced 60, are connected each to a first input of four QPSK mapping functions 61 to 64 which provide Gray code mapping to QPSK symbols as described above with reference to FIG. 2. The coder also comprises two delay elements 65 and 66 each providing a delay D of one symbol interval, thereby determining the four states of the coder, and modulo-2 adders 67 to 72. The outputs of the modulo-2 adders 69 to 72 are connected each to a second input of the mapping functions 61 to 64, respectively. Thus the QPSK mapping functions 61 to 64 are each supplied with one systematic information bit and one parity bit, and produce QPSK symbols SP-1 to SP-4 respectively which combine this systematic and parity information.

The lines 60, delay elements 65 and 66, and modulo-2 adders 67 to 72 are otherwise interconnected as illustrated in FIG. 9 in a manner which implements the following matrices W, G, $H_\varphi$ and $H_u$. In this example the matrices B, C, and Z are not provided because of their large size (for example, Z is a 4 by 64 matrix), but these can be derived from the illustration in FIG. 9 or from the following matrices:

$$W = \begin{bmatrix} 1 & 0 \\ 1 & 0 \end{bmatrix} \; G = \begin{bmatrix} 1 & 1 & 0 & 1 \\ 0 & 1 & 1 & 0 \end{bmatrix} \; H_\varphi = \begin{bmatrix} 0 & 0 \\ 1 & 0 \\ 0 & 0 \\ 0 & 1 \\ 0 & 0 \\ 1 & 1 \\ 0 & 0 \\ 1 & 0 \end{bmatrix} \; H_u = \begin{bmatrix} 1 & 0 & 0 & 0 \\ 1 & 1 & 1 & 0 \\ 0 & 1 & 0 & 0 \\ 0 & 0 & 1 & 1 \\ 0 & 0 & 1 & 0 \\ 0 & 0 & 0 & 1 \\ 0 & 0 & 0 & 1 \\ 0 & 0 & 0 & 1 \end{bmatrix}.$$

Again, it should be appreciated that the connections to the mapping functions 61 to 64 in FIG. 9 are provided by way of example and can be rearranged for other codes and other circumstances. For example, the four systematic bits could instead be supplied to two of the mapping functions, and the four parity bits could be supplied to the remaining two mapping functions. As another example, one of the mapping functions could be supplied with two systematic bits, another with two parity bits, and the remaining two each with one systematic and one parity bit. However, the particular arrangement of FIG. 9 is assumed for the further description below.

Figure 10:
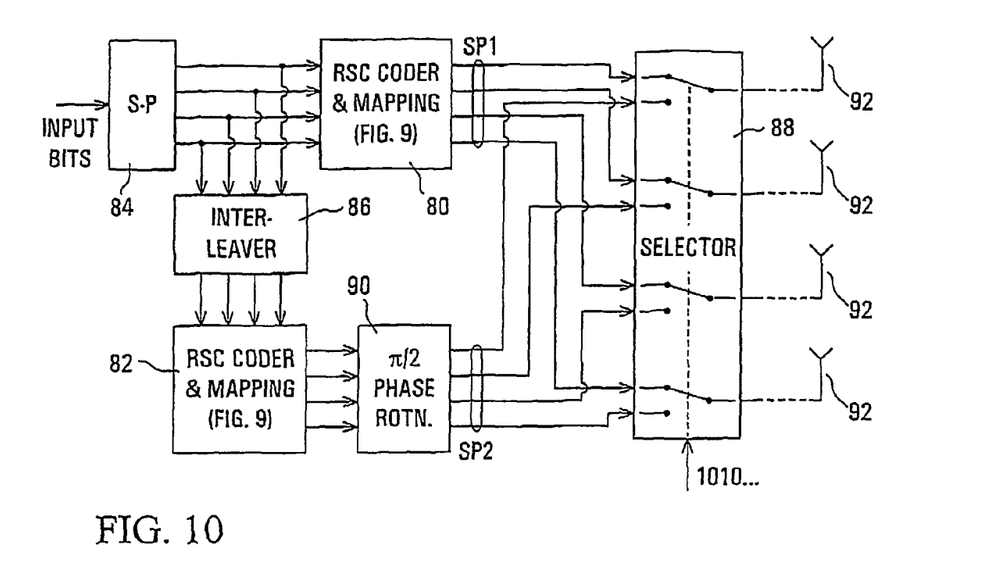
FIG. 10 illustrates parts of a coding arrangement for a transmitter in which the coder of FIG. 9 can be used in accordance with another embodiment of this invention.

FIG. 10 illustrates parts of a turbo STTCM coding arrangement for a transmitter having four transmit antennas, in which the coder of FIG. 9 is used to constitute each of the two component coder and mapping function units 80 and 82 of the turbo coding arrangement. An S-P converter 84 is supplied with input bits and converts these into groups of four bits, which are supplied directly as the input bits of the unit 80 and via an interleaver 86 to the unit 82. The interleaver 86 interleaves groups of four bits, maintaining an even-to-even and odd-to-odd, or an even-to-odd and odd-to-even, position mapping as described above. The systematic and parity symbol outputs of the unit 80, collectively referenced SP1, are coupled to a first set of inputs of a selector 88, and the systematic and parity symbol outputs of the unit 82, collectively referenced SP2, are coupled via an optional phase rotation unit 90 to a second set of inputs of the selector 88. The selector 88 is controlled by an alternating sequence of one and zero bits to couple its first and second sets of inputs alternately in successive symbol intervals to four output paths to the four antennas, referenced 92.

The optional phase rotation unit 90 provides a phase rotation of each symbol by $\pi/2$, and can comprise four multipliers each arranged to multiply a respective one of the QPSK symbols supplied to it by a signal $e^{j\pi/2}$, this having been found to improve performance in some situations, in particular in a transmitter using four antennas. This phase rotation unit can be omitted, a similar phase rotation unit can if desired be provided in a coding arrangement for a transmitter using only two antennas as described above, and/or phase rotations can be provided for some but not all of the QPSK symbols.

Thus it can be seen that the selector 88 couples to its outputs the systematic and parity information QPSK symbols from the unit 80 supplied with non-interleaved input bits in a first one of each two successive symbol intervals, and couples to its outputs the systematic and parity information QPSK symbols from the unit 82 supplied with interleaved input bits in a second one of each two successive symbol intervals.

Figure 11:
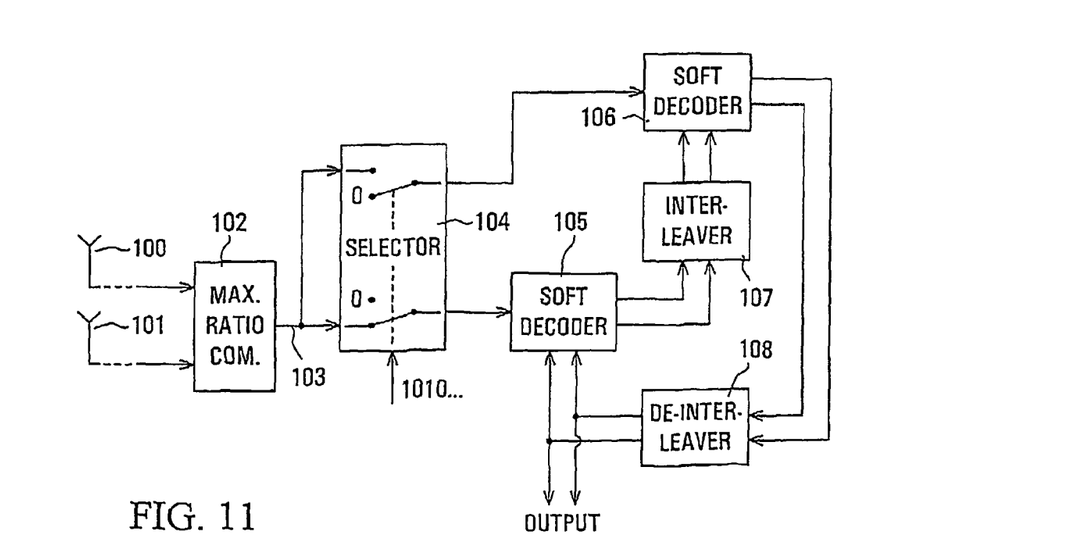
FIG. 11 illustrates parts of a receiver and decoding arrangement for use with the arrangement of FIG. 4 or FIG. 10.

FIG. 11 illustrates parts of a receiver and decoding arrangement for use with the arrangement of FIG. 4 or FIG. 10. As illustrated in FIG. 11, the receiver comprises two antennas 100 and 101 signals from which are coupled to and combined in a maximum ratio combiner (MRC) 102 to produce at its output on a line 103 a signal for decoding. For simplicity other known parts of the receiver, such as down converters and signal amplifiers and samplers, are not shown in FIG. 11 but are represented by dashed lines in the paths from the antennas 100 and 101 to the MRC 102. Although FIG. 11 illustrates the receiver as having two antennas, it may alternatively have only one antenna or more than two antennas, and methods other than maximum ratio combining may be used to produce the signal for decoding on the line 103.

The decoding arrangement comprises a de-puncturing selector 104, two soft trellis code decoders 105 and 106, an interleaver 107 which operates in the same manner as the interleaver of the turbo coding arrangement in the transmitter, e.g. the interleaver 34 in the arrangement of FIG. 4, and a de-interleaver 108 which operates in the converse manner to the interleaver 107. The units 105 to 108 are arranged in a manner generally known in the art of turbo code decoders, with the first decoder 105 producing a soft output (probability vector) that is interleaved by the interleaver 107 and supplied as a soft input to the second decoder 106, which also produces a soft output which is de-interleaved by the de-interleaver 108 and supplied as a soft input to the first decoder in an iterative arrangement, with the first decoder 105 operating on a non-interleaved input vector and the second decoder 106 operating on an interleaved input vector, the input vectors being derived from the signal to be decoded on the line 103. After a desired number of iterations, an output is derived from the decoding arrangement, for example from the output of the de-interleaver 108 as illustrated in FIG. 11.

It will be recalled from the description above that the coding arrangement of FIG. 4 or FIG. 10 provides symbols derived from non-interleaved bits and symbols derived from interleaved input bits alternately in successive symbol intervals. Correspondingly, the selector 104 is controlled, by a control signal of alternating ones and zeros as illustrated in FIG. 11, to have each of two states alternately in successive symbol intervals. In a first one of these two states, in which the selector is represented by switches having the states as shown in FIG. 11 and corresponding to the transmission of symbols derived from non-interleaved input bits, the selector 104 supplies the signal on the line 103 as the input vector to the first decoder 105 and supplies a zero input vector to the second decoder 106. Conversely, in a second one of these two states, in which the selector is represented by switches having the states opposite to those shown in FIG. 11 and corresponding to the transmission of symbols derived from interleaved input bits, the selector 104 supplies a zero input vector to the first decoder 105 and supplies the signal on the line 103 as the input vector to the second decoder 106. Thus the first decoder 105 operates on non-interleaved data, and the second decoder 106 operates on interleaved data, as is desired. The complexity of the decoders is simplified by the supply of the zero input vectors to these decoders in the alternating symbol intervals.

The performance of a coding and decoding arrangement as described above in accordance with an embodiment of this invention can usefully be compared with that of a concatenated turbo-TCM and STBC arrangement known from the prior art (Bauch) referred to in the Background of the Invention. In each case with two transmit antennas, two receive antennas, an interleaver block length of 1000 bits (500 symbols), and a Doppler frequency of 256 Hz, arrangements in accordance with the invention as described above have been found to provide a significant improvement, compared with the Bauch concatenated arrangement, in terms of bit error rate of about 0.75 to 1.1 dB over a range of signal (energy per information bit) to noise ratios from 1 to 4 dB.

Although particular embodiments of the invention are described in detail above, it can be appreciated that numerous modifications, variations, and adaptations may be made within the scope of the invention as defined in the claims.

What is claimed is:

1. A method of providing space-time diversity for information to be transmitted from a plurality of T antennas, $T \geq 2$, comprising the steps of:
   in each of a plurality of successive symbol intervals, producing T symbols comprising systematic information and parity information at outputs of each of two recursive systematic convolutional coders, to one of which coders input bits are supplied directly and to the other of which coders said input bits are supplied after interleaving of bit groups for respective symbol intervals in an interleaving block;
   changing a phase of the symbols from the two coders relative to one another; and
   selecting first and second different mappings, mapping each of T symbols from said symbols produced by the coders, in respective alternating symbol intervals for supply to the T antennas to provide said space-time diversity, the interleaving and mappings being arranged so that systematic information is selected for all of the input bits in the interleaving block.

2. A method as claimed in claim 1 wherein the first mapping selects the T symbols from one of the coders and the second mapping selects the T symbols from the other of the coders.

3. A method as claimed in claim 2 wherein T=2 and in each symbol interval each coder produces a systematic information symbol and a parity information symbol, wherein the first mapping provides the systematic information symbol and the parity information symbol from one of the coders for supply respectively to first and second antennas, and the second mapping provides the systematic information symbol and the parity information symbol from the other of the coders for supply respectively to the second and the first antennas.

4. A method as claimed in claim 1 wherein T is even and in each symbol interval each coder produces T/2 systematic information symbols and T/2 parity information symbols.

5. A method as claimed in claim 1 wherein the T symbols produced by each coder in each symbol interval include at least one symbol comprising systematic and parity information.

6. A method as claimed in claim 1 wherein T=2.

7. A method as claimed in claim 1 wherein T=4.

8. A method as claimed in claim 1 wherein changing a phase of symbols from the two coders relative to one another comprises providing a $\pi/2$ phase rotation of symbols produced by one of the two coders.

9. A method as claimed in claim 1 wherein the interleaved bit groups each comprise m bits where m is an integer, and symbols produced at the outputs of the coders comprise M-PSK symbols where $M=2^m$.

10. A method of iteratively decoding a received signal comprising symbols coded by the method of claim 1, comprising the steps of:
   supplying a received signal vector and a zero input vector alternately in successive symbol intervals as input vectors to two decoders for decoding the coding by said two recursive systematic convolutional coders respectively;
   interleaving, in the same manner as in the method of coding, a soft output of one of the decoders, corresponding to said one of the coders, to provide a soft input to the other of the decoders; and de-interleaving, conversely to the interleaving, a soft output of said other of the decoders to provide a soft input to said one of the decoders.

11. A coding arrangement comprising:

first and second recursive systematic convolutional coders each arranged to produce a plurality of T symbols, $T \geq 2$, in each of a plurality of successive symbol intervals from m bits supplied thereto, where m is an integer and the T symbols comprise systematic information and parity information;

an interleaver arranged to interleave groups each of m input bits within an interleaving block with a mapping of even-to-even and odd-to-odd, or even-to-odd and odd-to-even, positions;

input bits supplied to the first coder and to the interleaver, and interleaved bits supplied from the interleaver to the second coder;

a phase rotator for providing a phase rotation of symbols produced by one of the two coders; and a selector arranged to supply different ones of the T symbols from the coders in alternate symbol intervals to respective ones of T output paths, the T symbols selected in each of the alternating symbol intervals including all of the systematic information from a respective one of the coders.

12. A coding arrangement as claimed in claim 11 wherein each coder produces M-PSK symbols where $M=2^m$.

13. A coding arrangement as claimed in claim 11 wherein T is even and in each symbol interval each coder produces T/2 systematic information symbols and T/2 parity information symbols, and the selector is arranged to supply each output path with a systematic information symbol and a parity info nation symbol alternately in successive symbol intervals.

14. A coding arrangement as claimed in claim 11 wherein T=2.

15. A coding arrangement as claimed in claim 11 wherein T=4.

16. A coding arrangement as claimed in claim 11 wherein the phase rotator is configured to provide a $\pi/2$ phase rotation of symbols produced by one of the two coders.

17. A decoding arrangement for iteratively decoding received symbols coded by the coding arrangement of claim 11, comprising:

first and second soft output decoders for decoding the coding by said first and second recursive systematic convolutional coders respectively, in response to an input vector and soft input information;

an interleaver corresponding to the interleaver of the coder, arranged to couple soft output information from the first decoder as soft input information to the second decoder;

a de-interleaver converse to said interleavers, arranged to couple soft output information from the second decoder as soft input information to the first decoder; and a selector arranged to supply a received signal vector and a zero input vector alternately in successive symbol intervals as the input vector to the first and second decoders.

\* \* \* \* \*

UNITED STATES PATENT AND TRADEMARK OFFICE
CERTIFICATE OF CORRECTION

| | | |
|---|---|---|
| PATENT NO. | : 7,843,888 B1 | Page 1 of 1 |
| APPLICATION NO. | : 10/432216 | |
| DATED | : November 30, 2010 | |
| INVENTOR(S) | : Rui R. Wang (deceased) et al. | |

It is certified that error appears in the above-identified patent and that said Letters Patent is hereby corrected as shown below:

Column 16, lines 3-4 (claim 13): "info nation" should be --information--

Signed and Sealed this
Thirty-first Day of May, 2011

David J. Kappos
*Director of the United States Patent and Trademark Office*